Figure 6:
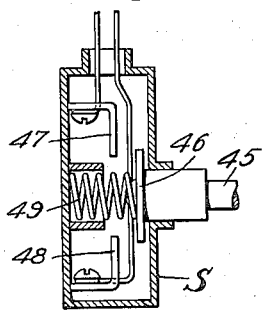

April 30, 1935. L. R. WILLIAMSON 1,999,225
INTERLOCKED ELECTRIC TRAVERSE AND HYDRAULIC CLAMP FOR MOBILE DRILLS
Filed Sept. 27, 1932 4 Sheets-Sheet 1
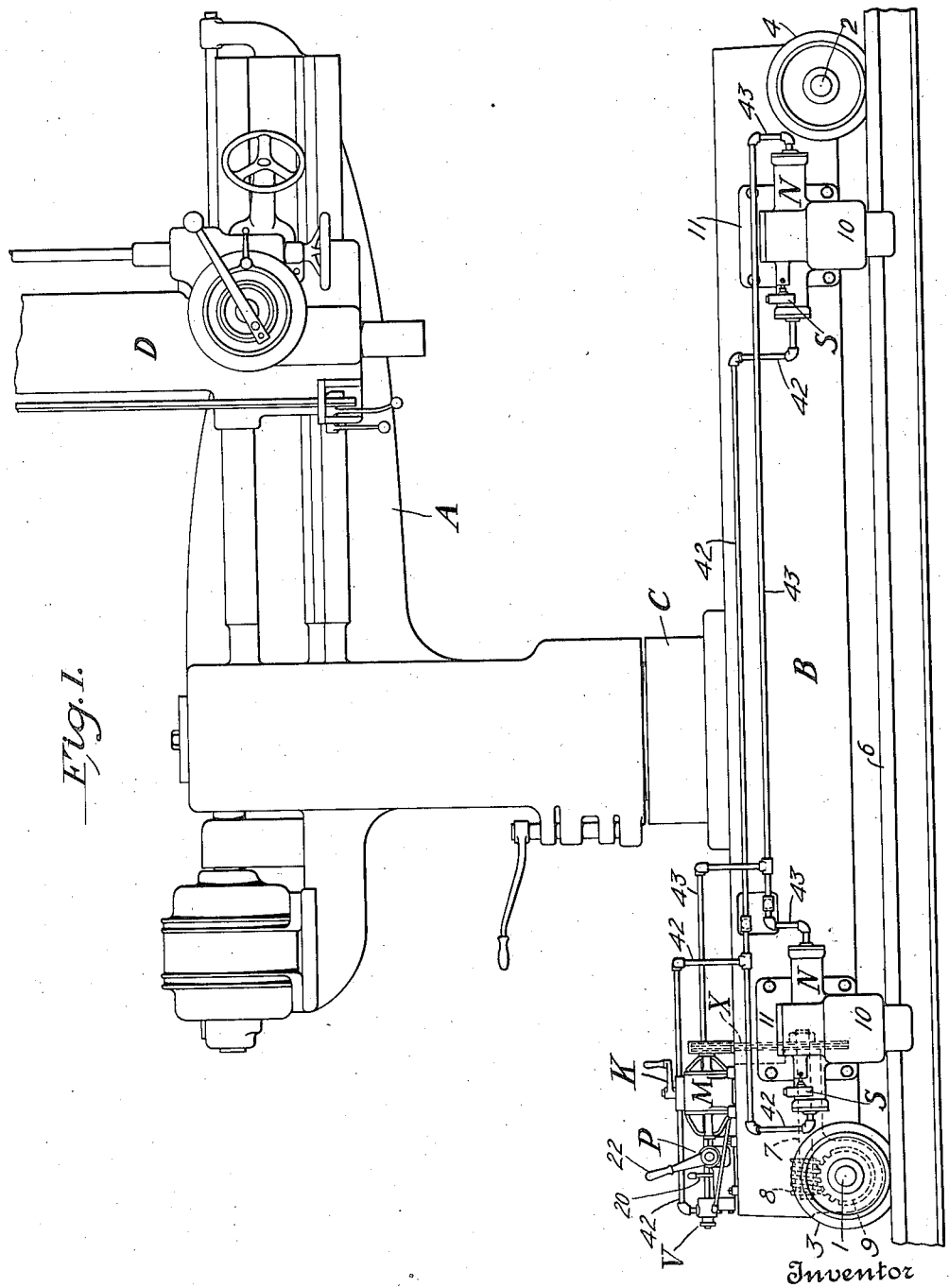
Inventor
Larkin R. Williamson
By Attorneys
Nathan, Bowman & Helferich

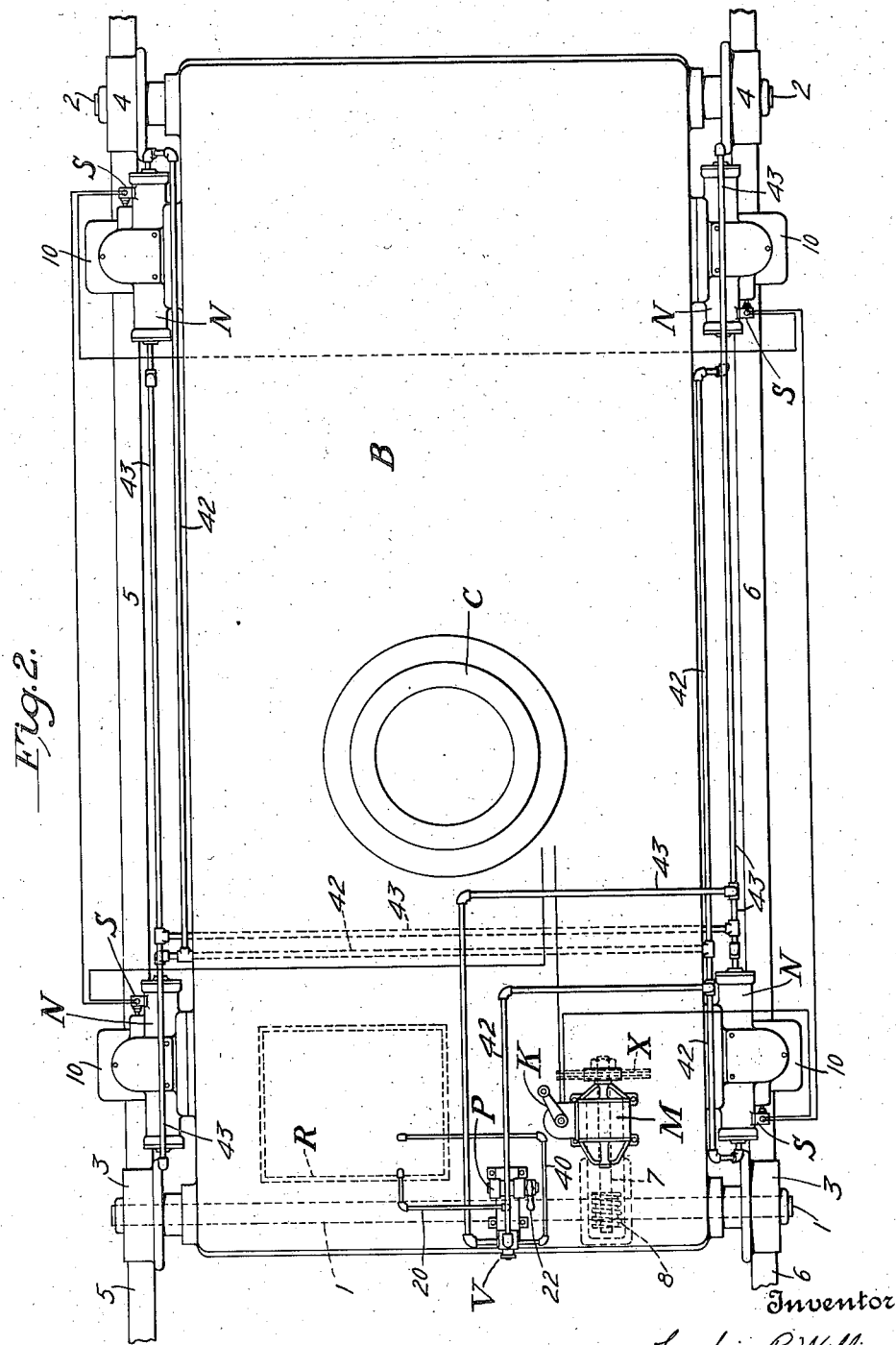

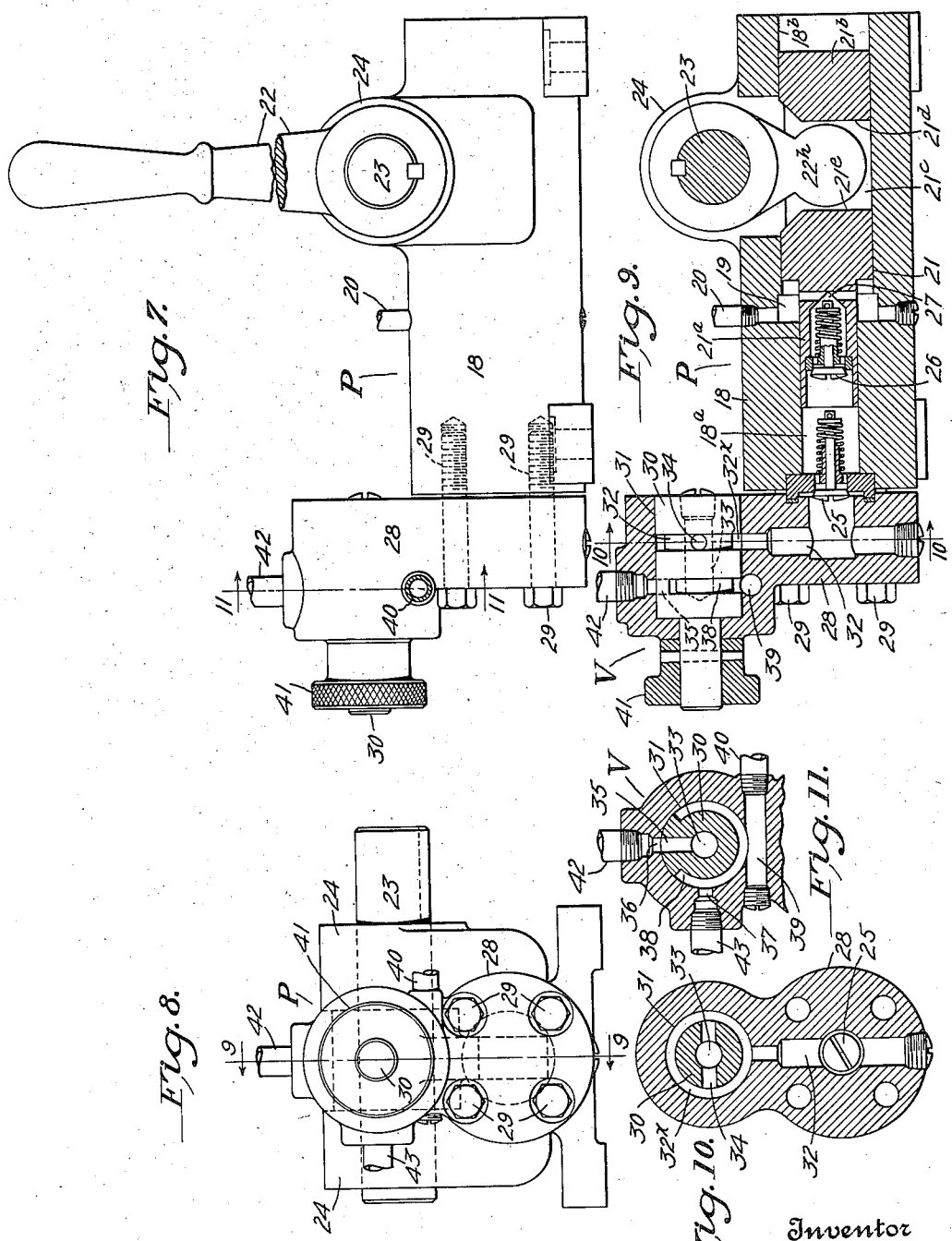

Patented Apr. 30, 1935

1,999,225

UNITED STATES PATENT OFFICE 1,999,225

INTERLOCKED ELECTRIC TRAVERSE AND HYDRAULIC CLAMP FOR MOBILE DRILLS

Larkin R. Williamson, Cincinnati, Ohio, assignor to The Cincinnati Bickford Tool Company, Oakley, Ohio, a corporation of Ohio Application September 27, 1932, Serial No. 635,010

9 Claims. (Cl. 77—27)

This invention relates to mobile machine tools and it deals more particularly with improved means for propelling such a machine along a suitable support and improved means for clamping the machine to its support during a machining operation.

In modern manufacturing it is frequently necessary to perform a plurality of machining operations, such for example as drilling, on workpieces which are too large and too cumbersome to be placed on the usual work-support of an ordinary machine tool. For performing such operations it has been found advantageous to place the work-piece alongside a track supporting a mobile machine tool, such as a radial drill, and to move the machine relative to the work-piece to enable it to perform the required operations. Obviously, if perfect work is to be produced, it is essential that the machine be securely held against all movement during the machining operation and to that end certain clamping devices heretofore have been provided to lock the machine to its support. Likewise, it is obvious that, to preclude the simultaneous application of opposing forces, means should be provided to prevent the propelling means from being operated while the clamps are closed and vice versa. To obviate this condition certain mechanical interlocks between the propelling means and the clamping means heretofore have been suggested.

Furthermore, it is highly desirable that when the machine is locked to its support that each of the clamp devices be fully and completely set otherwise a slight rocking of the machine may result. To that end various forms of equalizing devices have been provided between pairs of clamps and in some instances between the clamps of the various pairs.

From the foregoing it will be perceived that I do not claim to be the first to provide a mobile machine tool. Neither do I claim to be the first to provide means to propel the machine tool or to provide clamp means to hold the machine in its various positions. Nor do I claim to be the first to provide equalizing devices between the various clamps or an interlock between the propelling means and the clamp means. Attention is called to the fact, however, that all the devices heretofore provided for these purposes have been complicated in construction and, therefore, costly to manufacture and not entirely satisfactory in use.

A primary object of this invention is to provide improved and simplified means for propelling a machine tool along its support; for securely clamping the machine to its support; for interlocking the propelling means and the clamping means, whereby they may not be operative simultaneously; and for insuring that each of the clamps will be fully and completely set regardless of variations in the clamps or in the supporting rails or other support.

In accordance with this invention there is provided, on the machine base, two pairs of wheels adapted to track suitable rails or other support for the machine tool. One pair of these wheels is operatively connected to be driven by a suitable electric motor carried by the machine base. Clamping of the base to the rails is effected by a plurality of hydraulically actuated screw clamps having portions adapted to engage beneath the rail heads in opposition to the traction wheels. Individual hydraulic motors are provided for actuating these screw clamps and a suitable hydraulic pressure system is carried by the machine base and connected with the hydraulic motors. Valve means embodied in the hydraulic circuit controls the direction of actuation of the hydraulic motors whereby the clamps selectively may be set or released. Inasmuch as all of the clamps are actuated by the same hydraulic pressure it will readily be perceived that they will all be set equally tight without necessitating any mechanical equalizing devices therebetween as in the prior constructions.

An improved interlock between the propelling means and the clamp devices comprises an electric circuit adapted to be connected with the propelling motor and including a plurality of cut-out switches, one adjacent each clamp device. These switches are arranged in series in the electric circuit and, therefore, should any one of the switches be open the circuit is broken and the propelling motor may not be operated. To permit closure of the circuit and thereby operation of the propelling motor means (actuated by each of the clamp devices in its final opening movement) is provided to close one of said switches, therefore when all the clamps are completely released the propelling motor may be actuated, but not before. Likewise, to prevent the clamps from being set while the propelling motor is in operation the parts are so arranged that the initial movement of each of the hydraulic motors to effect clamping opens the switch and breaks the circuit to the propelling motor.

From the foregoing it will be perceived that I have provided simplified and improved interlocked propelling and clamping means for a mobile machine tool which are devoid of complicated mechanical connections to effect actuation and equalization of the clamps and the interlock of the clamping and propelling means, these being effectively obtained through simple hydraulic and electric connections with each of the clamp devices.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 5:
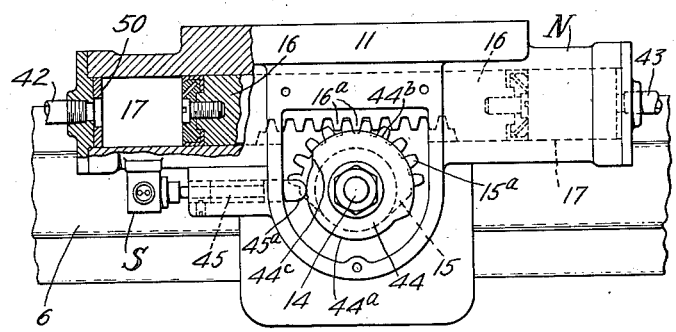
Figure 4:
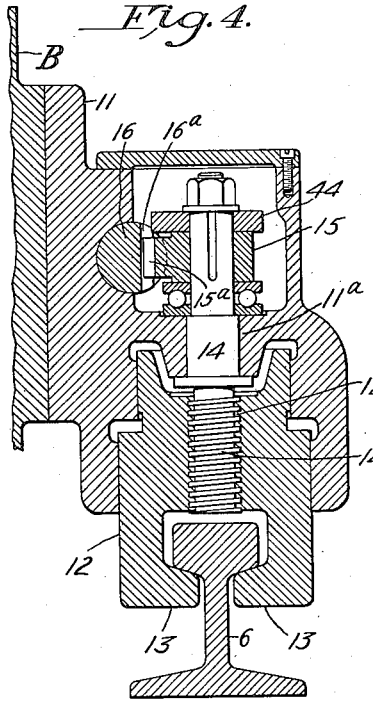
Figure 3:
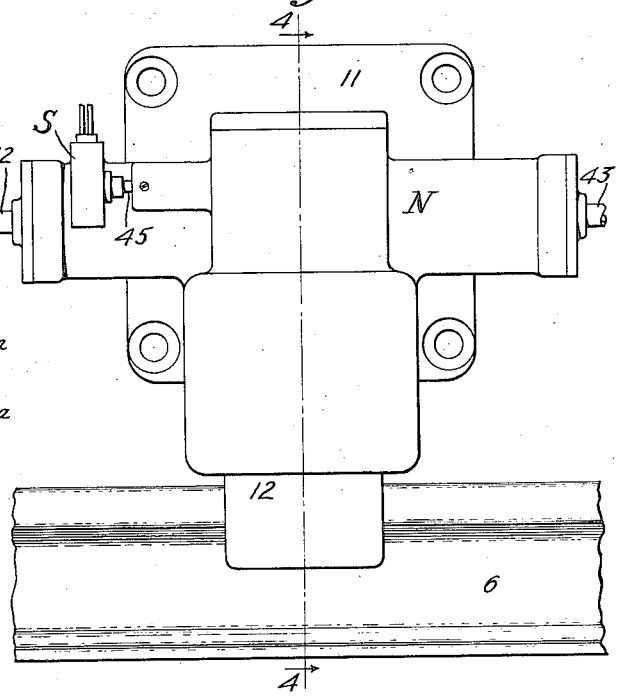

Figure 1 is a side elevation of a mobile radial drill embodying my invention. Fig. 2 is a plan view of Fig. 1, the drilling machine proper being omitted. Fig. 3 is an enlarged side elevation of one of the clamp devices. Fig. 4 is a vertical section on the line 4—4 of Fig. 3. Fig. 5 is a plan of Fig. 3 with certain parts broken away. Fig. 6 is a detail sectional view of one of the cut-out switches for making and breaking the circuit to the propelling motor in accordance with the actuation of the clamp device. Fig. 7 is a side view of a manually actuable pump adapted to supply the fluid pressure for actuating the clamp devices and the valve for controlling the actuation of the clamps. Fig. 8 is a left end view of Fig. 7. Fig. 9 is a central vertical section along the line 9—9 of Fig. 8. Fig. 10 is a section along the line 10—10 of Fig. 9 and Fig. 11 is a section along the line 11—11 of Fig. 7.

Referring more specifically to the drawings the invention is disclosed as embodied in a mobile radial drill comprising a base B, an upright column C supported by the base, a radial arm A rotatably journaled on the column and a tool D translatably mounted on the arm. All of these elements, except possibly the base, may be conventional and, therefore, detailed illustration and description thereof is deemed unnecessary.

Within suitable bearings provided by opposite ends of the base there are journaled horizontally disposed axles 1 and 2, to the opposite ends of which are secured pairs of wheels 3 and 4 adapted to track the upper surface of rails 5 and 6 or other suitable support for the machine tool. The wheels 3 serve as traction wheels to propel the base along its support and, therefore, are driven by an electric motor M supported upon the base. Any suitable driving connection may be provided between the motor M and the axle 1. As shown in the drawings this connection may consist of a sprocket and chain connection, designated generally as X between the motor shaft and a shaft 7 journaled lengthwise of the base. The shaft 7 carries a worm 8 which meshes with and drives a worm-wheel 9 fixed upon the axle 1.

Adjacent each of the wheels 3 and 4 there is provided a clamp device, designated generally as 10, adapted to cooperate with the wheels to grip the rails 5 and 6 thereby securely to lock the base against movement relative to its support. These clamp devices are all similar in construction and, therefore, a description of one will suffice for all. Referring now particularly to Figs. 3, 4 and 5 it will be seen that the clamp device comprises a bracket 11, secured upon the base B, having slidingly fitted therein a clamp block 12 having jaws 13 arranged beneath the head of the rail at the opposite sides of the central web. Rotatably but non-translatably mounted in a bearing 11a in the bracket 11 is a vertically arranged screw shaft 14 having on its lower end screw threads 14a threaded into a similarly threaded aperture 12a in the clamp block 12. Above the bearing 11a there is fixed to the shaft 14 a gear segment 15 the teeth 15a of which engage rack-teeth 16a formed in the side of a reciprocable piston 16 fitted within a cylinder 17 formed in the bracket 11. The cylinder 17 and piston 16 constitute a clamp actuating motor designated generally as N. The parts are so arranged that clockwise rotation of the segment 15 and the screw 14a (as viewed in plan) will cause the clamp block to be moved upwardly thereby to cause jaws 13 to grip the underside of the rail head and securely lock the machine base against all possible movement relative to the rails. Opposite rotation of the parts causes the clamps to be released.

As hereinbefore stated this invention provides fluid pressure means adapted to be connected with all of the clamp devices thereby to actuate them all to an equal degree of tightness. This fluid pressure means comprises a reservoir R (shown in dotted lines in Fig. 2) carried by the base B, a manually operable pump P adapted to draw oil or other suitable actuating fluid from the reservoir, a system of conduits, later to be described, to transmit the fluid under pressure from the pump to the clamp actuating hydraulic motors and manually actuable valve means V to determine the direction of flow of fluid into said motors thereby selectively to cause opening or closing of the clamps. Improved pump and valve means suitable for this purpose are shown in detail in Figs. 7 to 11 and will now be described. The pump comprises a casing or cylinder 18 adapted to be secured upon the base B and having an intake port 19 connected by a pipe 20 with the reservoir. The bore of the cylinder is shown as being of two diameters, a smaller 18a, within which is fitted a reduced portion 21a of a reciprocable piston 21 and a larger, 18b, within which is fitted a larger portion 21b of the piston. Reciprocatory motions may be given to the piston, to cause it alternately to take in fluid from the reservoir and discharge it under pressure through the conduit system, by means of a manually actuable hand lever 22 fixed upon a shaft 23 journaled in bearings 24 provided by the pump casing. One end of the lever projects into the pump casing and is provided with a head 22h fitted within an aperture 21c formed in the enlarged portion 21b of the piston. As viewed in Figs. 7 and 9 counterclockwise rotation of the lever 22 causes the head 22h to engage the wall 21d of the aperture 21c and shift the piston 21 to the right to effect intake of the pump, whereas clockwise rotation of the lever causes the head to engage the wall 21e and shift the piston to the left, thus effecting discharge of the fluid taken in on the previous stroke.

The forward end of the cylinder 18a is normally closed by a spring pressed check valve 25 which permits the fluid to be discharged from the left end of the cylinder but prevents return flow. The piston 21 is provided with a similar check valve 26 which permits fluid to flow from the intake port 19, through a passage 27 into the cylinder 18a but prevents return flow therefrom. Thus it will be seen that a one-way flow only is provided into and out of the cylinder. As the piston is retracted from the valve 25 it tends to create a vacuum in the piston 18a whereupon fluid flows through the conduit 20, intake port 19, passage 27, past the valve 26 and fills the cylinder 18ª. As the piston is reciprocated in the opposite direction the fluid in the cylinder is discharged through the valve 25 and into the before mentioned valve means V which serves to direct it to one or the other end of the clamp actuating hydraulic motors.

The valve means V preferably comprises a casing 28 secured to the pump casing by means of bolts 29 and a manually rotatable and suitably ported plug 30 fitted within a bore 31 formed in the casing. A passage 32 in the valve casing receives the fluid discharged through the valve 25 and conducts it to the bore 31 into which the valve plug is fitted. The valve plug is formed with a reduced annular portion 32 providing an annular channel 32ˣ in permanent connection with the passage 32, an axial bore 33, a radial bore 34 connecting the axial bore with the channel 32ˣ, and a second radial bore 35 adapted selectively to connect the bore with either of two ports 36 or 37 formed in the valve casing. The plug is further provided with a segmental channel 38 adapted to connect either the port 36 or the port 37 (whichever is isolated from the radial bore 35) with a passage 39, also formed in the valve casing. A conduit 40 connects with the passage 39 and extends back to the reservoir to return thereto fluid discharged by the clamping motors, as later will be described. A knurled hand wheel 41 is secured to the valve plug 30 and serves as means for selectively shifting the valve into either of its two effective positions thereby to cause closing or opening of the clamps, as may be desired.

In Figs. 9, 10 and 11 the valve is shown in the position to effect closing of the clamps. In this position fluid discharged by the pump flows outwardly from the valve V through port 36 and thence through a system of conduits 42 to one end of the clamp actuating motors N, to wit: the left end as shown in Figs. 3 and 5 which, as hereinbefore described, effects clockwise rotation of the shaft 14 and screw 14ª, thereby setting of the clamps. Fluid in the opposite end of the clamp motors is discharged through a system of conduits, designated generally as 43, which extends back to the valve V and connects with the port 37 from which the fluid is returned to the reservoir as above described. When the valve 30 is shifted to its other position pressure fluid flows outwardly through port 37, through conduit system 43 to the opposite ends of the clamp actuating motors N thereby causing the clamps to be released. In this setting the fluid discharged by the clamp motors is returned to the reservoir through conduits 42, port 36, channel 38, passage 39 and conduit 40.

As hereinbefore described this invention also contemplates an interlock between the propelling means and the clamping means whereby they may not be operative simultaneously. This has been effectively provided in a simple and inexpensive manner as now will be described. Adjacent each of the clamp devices there is provided a cut-out switch, designated generally as S, and shown in detail in Fig. 6. These switches are all connected in series in the power circuit for the propelling motor M, as shown most clearly in Fig. 2 and are actuated in timed relation with the opening and closing of the clamps. Fixedly secured to each of the clamp screw shafts 14 is a plate 44 having concentric portions 44ª and 44ᵇ and a cam surface 44ᶜ connecting said concentric portions. Slidingly fitted in a bore formed in the clamp casing is a spring pressed switch actuating rod 45 having, on one end, a rounded head 45ª adapted to engage the periphery of the plate 44. The opposite end of the rod enters the casing of the switch S and carries a contact plate 46 adapted to make and break contact between separated terminals 47 and 48 to which one of the lines of the power circuit is connected. A spring 49 located within the switch casing tends to hold the rod 45 in its extreme right position, as seen in Figs. 5 and 6 and thereby tends to open the circuit. As each of the clamp screws is rotated counterclockwise to open the clamp, and near the end of such movement, the cam surface 44ᶜ of the plate shifts the rod 45 to cause the contact plate 46 to connect the terminals 47 and 48. When all of the clamps have been fully released the line connecting all of the switches is completely closed after which, by manipulation of a suitable controller K, adjacent the motor M, the operator may cause the motor to operate, thereby to effect translation of the machine on its support in either direction. Should any one of the clamps be not fully released the line will remain open and the operator shall, therefore, be unable to start the propelling motor.

This safety means also prevents the operator from setting the clamps while the propelling motor is yet effective to move the machine. During translation of the machine, should the operator shift the valve and actuate the pump to set the clamps initial rotation of the screws 14 will remove the larger concentric portion 44ᵇ out of the path of the spring pressed plunger 45 whereupon the head 45ª will ride down the cam 44ᶜ and the plate 46 will be disengaged from the terminals 47 and 48 thereby breaking the circuit to the propelling motor M and causing the machine to be brought to rest.

To limit the unclamping movement of the clamps and also to cushion the parts in such movement I preferably insert a cushioning washer 50 of any suitable material in the left end of each of the clamp actuating cylinders (as shown in Fig. 5) against which the piston may come to rest without noise or jar.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of United States:

1. A mobile machine tool combining a base adapted to be mounted on a support; traction wheels carried by said base and engaging said support; an electric motor and operative connections between said motor and a pair of said wheels for propelling said base along said support; a plurality of hydraulically actuated clamp devices carried by said base and adapted to engage said support to clamp the base to the support; an hydraulic pressure system carried by said base and connected to actuate each of said clamp devices; and an electric circuit connected with said propelling motor and including a switch adjacent each of said clamp devices adapted to be closed by the final unclamping movement of the clamp thereby to close the circuit to said motor only when all of the clamps are released.

2. A mobile machine tool combining a base adapted to be mounted on a support; traction wheels carried by said base and engaging said support; an electric motor and operative connections between said motor and a pair of said wheels for propelling said base along said support; a plurality of clamp devices carried by said base and adapted to engage said support to clamp the base to the support; means to actuate said clamp devices selectively to effect clamping and unclamping action; and an electric circuit connected with said propelling motor and including a switch adjacent each of said clamp devices adapted to be closed by the final unclamping movement of the clamp thereby to close the circuit to said motor only when all of the clamps are released.

3. A mobile machine tool combining a base adapted to be mounted on a support; traction wheels carried by said base and engaging said support; an electric motor and operative connections between said motor and a pair of said wheels for propelling said base along said support; a plurality of clamp devices carried by said base and adapted to engage said support to clamp the base to the support; means to actuate said clamp devices selectively to effect clamping and unclamping action; and an electric circuit connected with said propelling motor and including a switch adjacent each of said clamp devices adapted to be opened by the initial clamping movement of the clamp thereby to open the circuit to said motor thereby to render said propelling means inoperative.

4. A mobile drill combining a base adapted to be mounted on a support; electrically controlled means including an electric motor and an electric circuit connected thereto to propel said base along said support; a plurality of hydraulically actuated clamp devices carried by said base and adapted to engage said support to clamp the base to the support; an hydraulic pressure system carried by said base and connected to actuate each of said clamp devices; and means associated with each of said clamping devices and actuated by the initial closing movement of the first operated one of said clamping devices to break said electric circuit and thereby render said propelling means ineffective.

5. A mobile machine tool combining a base adapted to be mounted on a support; wheels carried by said base and engaging said support; an electric motor mounted on said base and operatively connected to drive said wheels; an electric circuit connected with said motor; a plurality of hydraulically actuated clamp devices carried by said base and adapted to engage said support to clamp the base to the support, each of said clamp devices including a clamp element adapted to engage said support, screw means to shift said clamp element and an hydraulic motor to actuate said screw means; an hydraulic pressure system carried by said base and connected to actuate each of said hydraulic motors; said system including a reservoir, a pump connected to withdraw fluid from said reservoir and to supply it under pressure to said hydraulic motors; valve means to determine the direction of flow of said pressure fluid in said system thereby to control the opening and closing of said clamps; and means actuated by each of said clamps to open said electric circuit when said clamps are closed.

6. A mobile drill combining a base adapted to be mounted on a support; a plurality of hydraulically actuated clamp devices for clamping said base to its support; manually actuated means to control the actuation of said clamp devices, an electric motor carried by the base and operatively connected to propel the base along its support; a power circuit connected to said motor; and means to break the circuit to said electric motor by the closing of said clamps thereby to prevent actuation of the propelling motor when the clamps are closed.

7. A mobile radial drill combining a base adapted to be mounted on a support; traction wheels carried by said base and engaging said support; an electric motor and operative connections between said motor and a pair of said wheels for propelling said base along said support; a plurality of clamp devices carried by said base and adapted to engage said support to clamp the base to the support; means to actuate said clamp devices selectively to effect clamping and unclamping action; an electric circuit adapted to be connected with said propelling motor and including a switch adjacent each of said clamp devices adapted to be closed by the final unclamping movement of the clamp; and a manually operable motor controller embodied in said circuit in series with said switches and adapted to give an operator control over said motor after all of said switches have been closed.

8. A mobile machine tool combining a base adapted to be mounted on a support; traction wheels carried by said base and engaging said support; an electric motor and operative connections between said motor and a pair of said wheels for propelling said base along said support; a plurality of clamp devices carried by said base and adapted to engage said support to clamp the base to the support, each of said clamp devices including a rotatable element; means to rotate said elements selectively to effect clamping and unclamping action; an electric circuit connected with said propelling motor and including a switch adjacent each of said clamp devices; and means actuated by the rotation of said elements each in its clamp opening movement to close one of said switches.

9. A mobile machine tool combining a base adapted to be mounted on a support; traction wheels carried by said base and engaging said support; an electric motor and operative connections between said motor and a pair of said wheels for propelling said base along said support; a plurality of clamp devices carried by said base and adapted to engage said support to clamp the base to the support, each of said clamp devices including a rotatable shaft; means to rotate said shaft selectively to effect clamping and unclamping action; an electric circuit connected with said propelling motor and including a cutout switch adjacent each of said clamp devices; a switch actuating slide rod for each of said switches; and a cam carried by each of said shafts and engaging one of said slide rods to cause it to close one of said switches when its associated clamp is opened thereby to close all of said switches and complete the circuit to the motor when all of said clamps are opened.

LARKIN R. WILLIAMSON.